United States Patent
Ho

(10) Patent No.: US 8,131,907 B2
(45) Date of Patent: Mar. 6, 2012

(54) MULTI-PROCESSOR SYSTEM SUPPORTING DYNAMIC POWER SAVING AND DYNAMIC POWER SAVING METHOD THEREOF

(75) Inventor: Kuan-Jui Ho, Taipei Hsien (TW)

(73) Assignee: VIA Technologies, Inc., New Taipei (TW)

( * ) Notice: Subject to any disclaimer, the term of this patent is extended or adjusted under 35 U.S.C. 154(b) by 315 days.

(21) Appl. No.: 12/545,284

(22) Filed: Aug. 21, 2009

(65) Prior Publication Data

US 2011/0016251 A1    Jan. 20, 2011

(30) Foreign Application Priority Data

Jul. 16, 2009    (TW) .............................. 98124136 A

(51) Int. Cl.
*G06F 13/36* (2006.01)
(52) U.S. Cl. .......... 710/310; 710/107; 710/110; 710/37; 713/320
(58) Field of Classification Search .................. 713/300, 713/310, 320, 323–324, 330; 710/104–107, 710/110–119, 36–37, 306–310
See application file for complete search history.

(56) References Cited

U.S. PATENT DOCUMENTS

| 5,713,029 | A  | * | 1/1998  | Kaiser et al. ................. 713/322 |
| 5,930,486 | A  | * | 7/1999  | Looi et al. ..................... 711/113 |
| 6,209,053 | B1 | * | 3/2001  | Kurts ............................. 710/113 |
| 6,711,691 | B1 | * | 3/2004  | Howard et al. ............... 713/300 |
| 7,131,015 | B2 | * | 10/2006 | Flautner et al. .............. 713/320 |
| 7,171,568 | B2 | * | 1/2007  | Dayan et al. ................. 713/300 |
| 7,296,167 | B1 | * | 11/2007 | Hughes ......................... 713/310 |
| 7,398,403 | B2 | * | 7/2008  | Nishioka ...................... 713/300 |
| 7,529,955 | B2 | * | 5/2009  | Kurts et al. .................. 713/320 |
| 7,814,252 | B2 | * | 10/2010 | Hoshaku ....................... 710/240 |
| 2006/0059377 | A1 | * | 3/2006  | Sherburne .................... 713/300 |
| 2008/0288796 | A1 | * | 11/2008 | Nakamura et al. ........... 713/320 |
| 2009/0249106 | A1 | * | 10/2009 | Sajayan et al. ............... 713/324 |

* cited by examiner

*Primary Examiner* — Raymond Phan
(74) *Attorney, Agent, or Firm* — J.C. Patents

(57) ABSTRACT

A multi-processor system and a dynamic power saving method thereof are provided. The multi-processor system includes a plurality of processors and a chipset. Each of the processors has a plurality of standard bus request pins and a specific bus request pin, and the standard bus request pins of each processor are alternately connected to the standard bus request pins of other processors respectively. The chipset is coupled to the specific bus request pins of the processors for detecting a control request signal on the specific bus request pins. When the chipset detects the control request signal, the chipset turns on an input buffer connected with the processors so that the processors can access data through the input buffer. When the chipset does not detect the control request signal, the chipset turns off the input buffer.

17 Claims, 4 Drawing Sheets

MULTI-PROCESSOR SYSTEM SUPPORTING DYNAMIC POWER SAVING AND DYNAMIC POWER SAVING METHOD THEREOF

CROSS-REFERENCE TO RELATED APPLICATION

This application claims the priority benefit of Taiwan application Ser. No. 98124136, filed on Jul. 16, 2009. The entirety of the above-mentioned patent application is hereby incorporated by reference herein and made a part of this specification.

BACKGROUND OF THE INVENTION

1. Field of the Invention

The present invention generally relates to a processor system and a power saving method thereof, and more particularly, to a multi-processor system and a dynamic power saving method thereof.

2. Description of Related Art

A multi-processor system is composed of a general processor and one or multiple processors with special calculation capabilities. The multi-processor system adopts the concept of resource sharing to reduce the hardware cost thereof, wherein the most commonly shared resource is the storage. A storage can be used for storing any data, such as signals for indicating communication statuses between the processors and data to be simultaneously accessed by multiple processors.

Along with the widespread of multi-processor systems, many embedded devices in the market, such as desktop computers, notebook computers, cell phones, or personal digital assistants (PDAs), adopt such structures. By integrating the calculation characteristics of different processors, a multi-processor system can achieve a better performance and the efficiency thereof is higher than that of a system using a single high-speed processor.

Due to different hardware structures and different implementations of lower-level calculation units between processors, heterogeneous processors provide different execution time and power consumption when they are used to perform the same task. Thus, presently, the development of a multi-processor system is usually focused on the execution time and power consumption regarding a specific task, and task scheduling in the operating system is adjusted according to the execution outcome, so as to reduce the power consumption and improve the performance of the system. However, how to effectively integrate different characteristics of hardware structures of different processors and accordingly reduce the power consumption of the entire system is still a major subject in the industry.

SUMMARY OF THE INVENTION

Accordingly, the present inventions are directed to a multi-processor system and a dynamic power saving method of a multi-processor system, wherein when the processors enter an active status, an input buffer in a chipset is dynamically turned on or off to reduce the power consumed by the input buffer.

The present invention provides a multi-processor system including a plurality of processors and a chipset. Each of the processors has a plurality of standard bus request pins and a specific bus request pin, and the standard bus request pins of each of the processors are alternatively connected to the standard bus request pins of other processors respectively. The chipset is coupled to the specific bus request pins of the processors for detecting a control request signal on the specific bus request pins. When the chipset detects the control request signal, the chipset turns on an input buffer connected with the processors so that the processors can access data through the input buffer. Contrarily, when the chipset does not detect the control request signal, the chipset turns off the input buffer.

The present invention provides a dynamic power saving method for a multi-processor system, wherein the multi-processor system includes a plurality of processors and a chipset, and each of the processors is coupled to the chipset through a specific bus request pin. In the present method, a control request signal on the specific bus request pins is detected by the chipset. When the chipset detects the control request signal, an input buffer connected with the processors is turned on so that the processors can access data through the input buffer. Contrarily, when the chipset does not detect the control request signal, the input buffer is turned off.

The present invention provides a multi-processor system including a plurality of processors and a chipset. Each of the processors has a plurality of bus request pins, and the bus request pins of each processor are alternatively connected to the bus request pins of other processors respectively. The chipset is respectively coupled to the bus request pins of the processors for detecting a control request signal on the bus request pins. When the chipset detects the control request signal, the chipset turns on an input buffer connected with the processors so that the processors can access data through the input buffer. When the chipset does not detect the control request signal, the chipset turns off the input buffer.

As described above, the present invention provides a multi-processor system and a dynamic power saving method thereof, wherein an input buffer is turned on or off according to whether any processor issues a control request signal regarding a bus, so that the power consumption of the multi-processor system is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
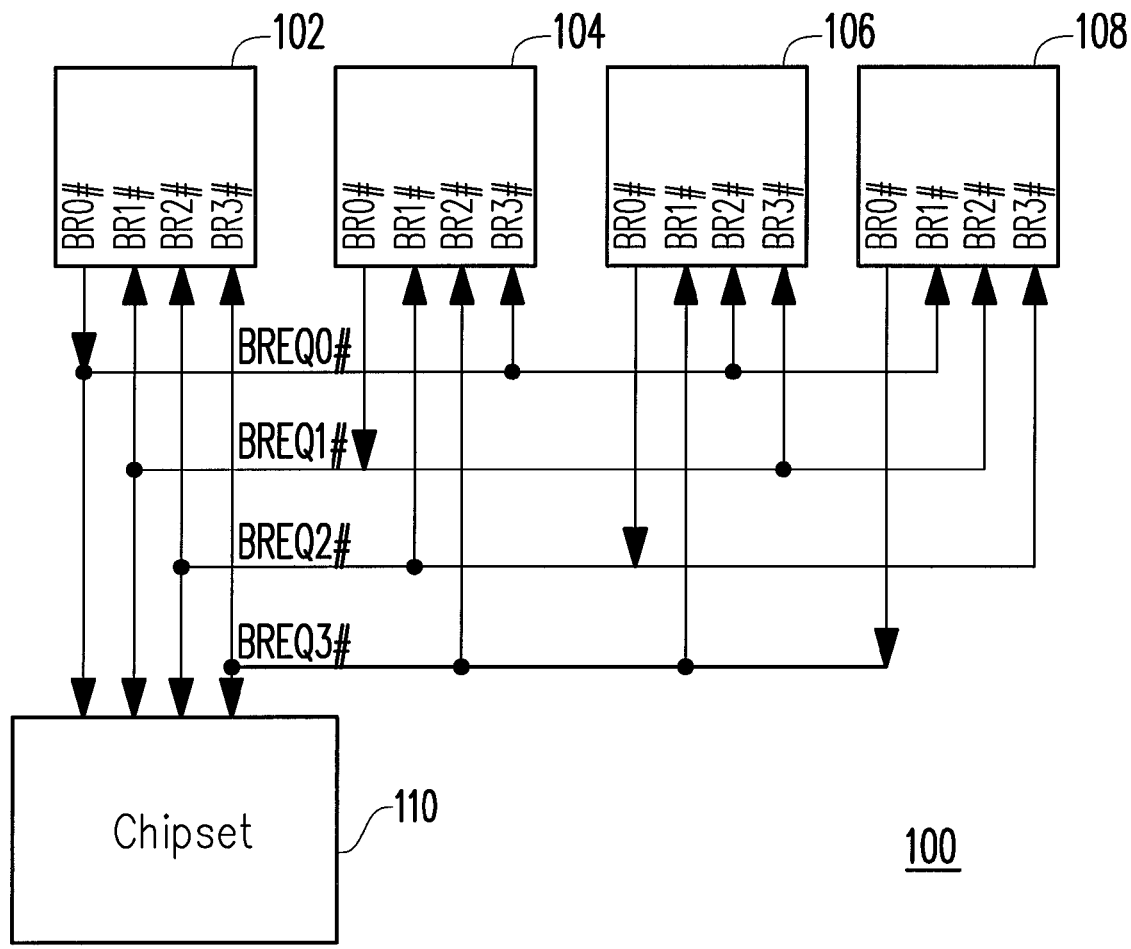
FIG. 1 is a circuit block diagram of a multi-processor system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

According to the present invention, the bus request pins of each processor in a multi-processor system are respectively coupled to a chipset, or the processors are coupled to the chipset through additional bus request pins, so that the chipset can obtain the control request status of each processor regarding a bus in real time when the processors of the multi-processor system are in an active status. Herein the "active status" is opposite to the sleep state (for example, C1, C2, C3, or Cn status) power management defined by the Advanced Configuration and Power Interface (ACPI) specification. Namely, the active status refers to the C0 execution status.

Every time when a processor requests to use a bus for transmitting data, the chipset turns on an input buffer connected with the processor to allow the processor to transmit data through the input buffer. However, in the active status, if no processor requests to use the bus for transmitting data during a certain time period, the chipset turns off the input buffer to reduce the power consumed by the input buffer. Embodiments of the present invention will be described below with reference to accompanying drawings.

FIG. 1 is a circuit block diagram of a multi-processor system according to an embodiment of the present invention. Referring to FIG. 1, in the present embodiment, the multi-processor system 100 includes processors 102, 104, 106, and 108 and a chipset 110. Each of the processors 102, 104, 106, and 108 includes four bus request pins BR0#, BR1#, BR2#, and BR3#, and the bus request pins of the processors are alternatively connected with each other through bus request lines BREQ0#, BREQ1#, BREQ2#, and BREQ3#. For example, the pin BR0# of the processor 102 is connected to the pin BR3# of the processor 104, the pin BR2# of the processor 106, and the pin BR1# of the processor 108, the pin BR1# of the processor 102 is connected to the pin BR0# of the processor 104, the pin BR3# of the processor 106, and the pin BR2# of the processor 108, and so on.

It should be noted that when a processor needs the bus for transmitting data, the processor usually issues a notification signal through the pin BR0# to other processors to notify them that the current processor has requested to use the bus, and the processor also issues a control request signal to the chipset through the pin BR0# to obtain the control over the bus. Accordingly, in the present invention, the bus request pins BR0# of all the processors are connected to the chipset 110 so that the chipset 110 can obtain the control request status of each processor over the bus in real time.

Figure 2:
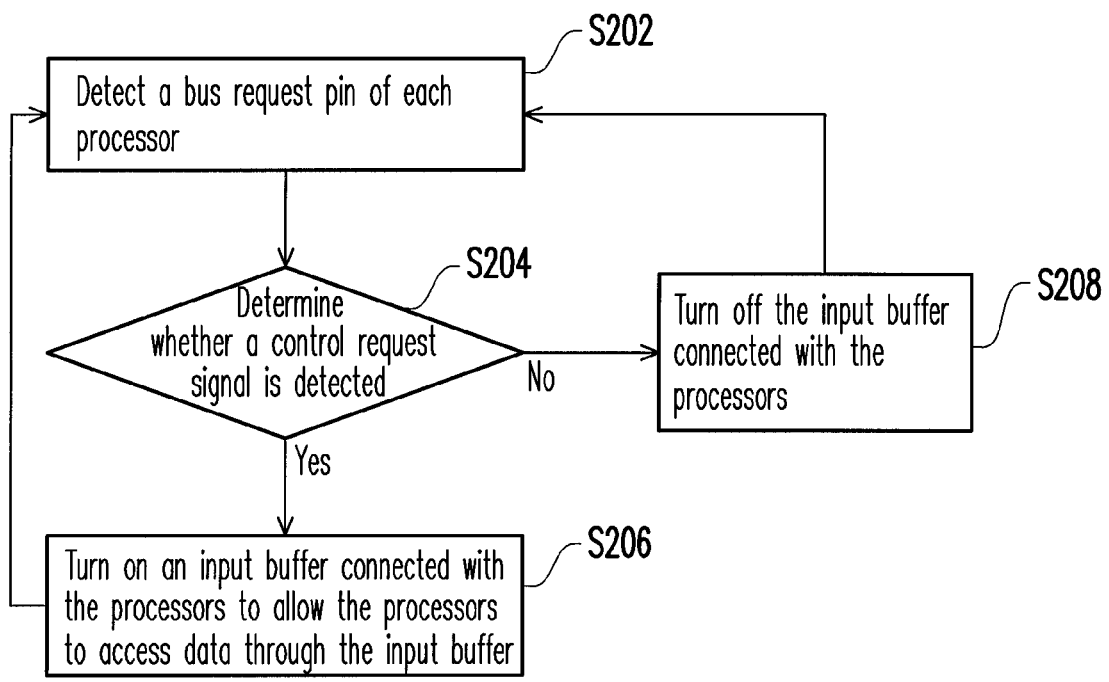
FIG. 2 is a flowchart of a dynamic power saving method of a multi-processor system according to an embodiment of the present invention.

FIG. 2 is a flowchart of a dynamic power saving method of a multi-processor system according to an embodiment of the present invention. Referring to both FIG. 1 and FIG. 2, in the present embodiment, when the processors 102, 104, 106, and 108 of the multi-processor system 100 are in the active status, if none of the processors 102, 104, 106, and 108 requests to use the bus for transmitting data for a certain time period, the input buffer in the chipset 110 that is connected with the processors is turned off to reduce the power consumed by the input buffer.

When the input buffer in the chipset 110 is the turned-off status, the chipset 110 detects the bus request pins of each processor through the bus request lines BREQ0#, BREQ1#, BREQ2#, and BREQ3# (step S202) and determines whether a control request signal is detected (step S204).

If the chipset 110 detects the control request signal (i.e., a processor requests to use the bus for transmitting data), the chipset 110 turns on the input buffer connected with the processor to allow the processor to access data through the input buffer (step S206). After that, every time when a processor finishes using the bus for transmitting data, if none of the processors 102, 104, 106, and 108 requests to use the bus for transmitting data within a certain time period, the input buffer is turned off to reduce the power consumption thereof, and step S202 is executed again to continue detecting the bus request pins of each processor.

If the chipset 110 does not detect the control request signal from the multi-processor system, the processors remain in a paused or sleep status, and accordingly the input buffer in the chipset is kept in the turned-off status (step S208) to reduce the power consumption thereof. Foregoing steps of turning on or off the input buffer may be accomplished by turning on or off the power supply for the input buffer. However, the present invention is not limited thereto. After step S208, the chipset 110 continues to detect the bus request pins of each processor (step S202).

According to the present invention, when a multi-processor system is in normal operation (for example, the processors thereof are in the C0 active status), an input buffer in a chipset that is currently not in use is turned off according to whether any processor issues a control request signal, so as to achieve dynamic power saving.

Besides connecting all the bus request pins of the processors to the chipset, in another embodiment of the present invention, an additional specific bus request pin is disposed for connecting each processor to the chipset such that the chipset can directly obtain the control request status of the processor over the bus. This technique will be described below in detail with reference to another embodiment of the present invention.

Figure 3:
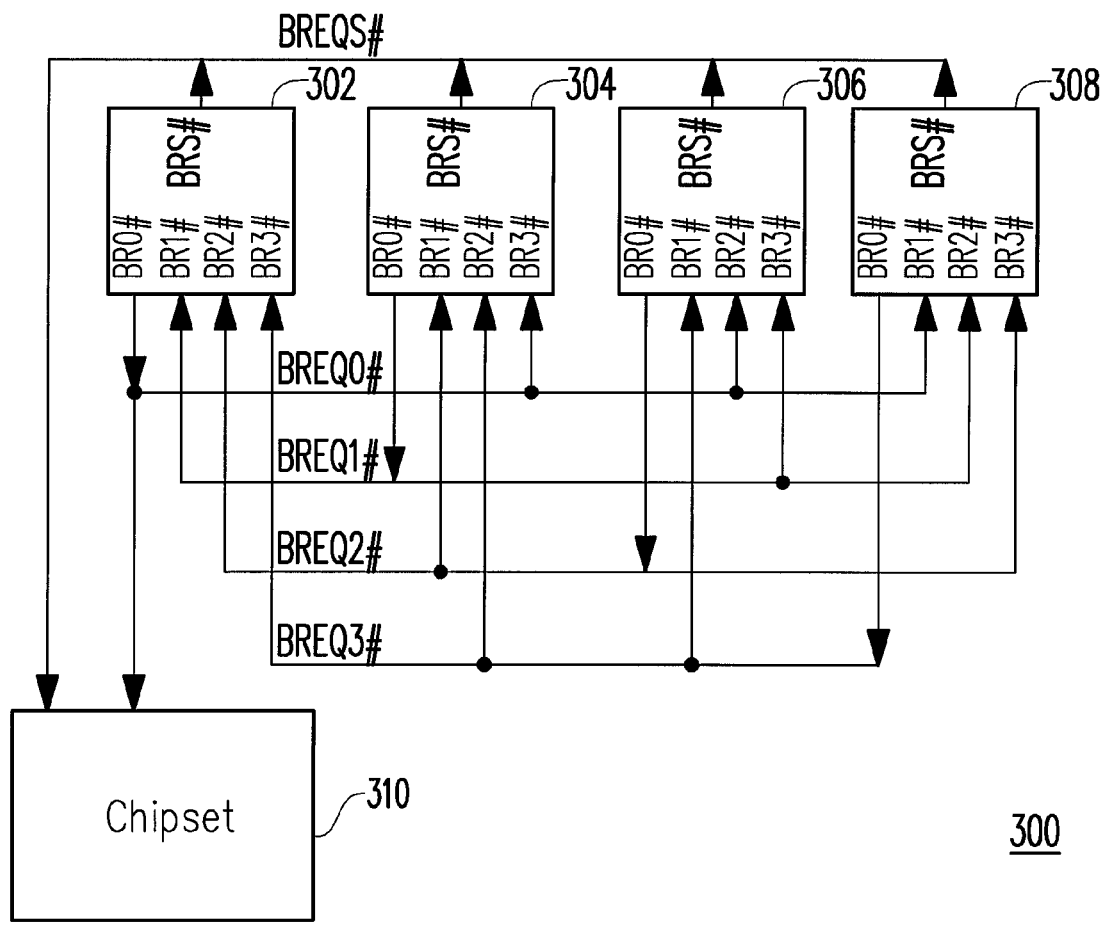
FIG. 3 is a circuit block diagram of a multi-processor system according to an embodiment of the present invention.

FIG. 3 is a circuit block diagram of a multi-processor system according to an embodiment of the present invention. Referring to FIG. 3, in the present embodiment, the multi-processor system 300 includes processors 302, 304, 306, and 308 and a chipset 310. Each of the processors has four standard bus request pins BR0#, BR1#, BR2#, and BR3#, and the bus request pins of the processors are alternatively connected with each other through bus request lines BREQ0#, BREQ1#, BREQ2#, and BREQ3#. The dispositions of these pins are the same as those described in foregoing embodiment therefore will not be described herein.

It should be noted that the difference between the present embodiment and previous embodiment is that in the present embodiment, an additional specific bus request pin BRS# is disposed on each of the processors instead of connecting the bus request pins BR0# of all the processors to the chipset. Besides, in the present embodiment, the specific bus request pins BRS# of the processors are connected with each other and coupled to the chipset 310 through an independent specific bus request line BRQS#, and additional pins are correspondingly disposed on the chipset 310. Herein the "specific bus request pin BRS#" and the "specific bus request line BRQS#" refer to additional dispositions regarding a general multi-processor structure, namely, additional dispositions made in the present embodiment regarding a standard structure.

As to the original bus request pins BR0#, BR1#, BR2#, and BR3#, the pin BR0# of the processor 302, and the pin BR3# of the processor 304, the pin BR2# of the processor 306, and the pin BR1# of the processor 308 connected to the pin BR0# of the processor 302 are simply coupled to the chipset 310. When a processor needs to use the bus, the processor issues a control request signal through the specific bus request pin BRS#. Before issuing the control request signal, the processor further issues a notification signal to other processors through the standard bus request pin BR0# to notify other processors that the current processor has requested to use the bus.

It should be mentioned that if in the present embodiment, the specific bus request pins BRS# and the specific bus request line BRQS# are not disposed and each processor issues the control request signal through its own bus request pin BR0#, because only the pin BR0# of the processor 302 is coupled to the chipset 310, the chipset 310 cannot detect the control request signal issued by the pins BR0# of the processors 304, 306, and 308, and accordingly the power saving cannot be achieved through the technique provided by the present invention. Thereby, this problem is resolved in the present embodiment by disposing the specific bus request pins BRS# and the specific bus request line BRQS#, so as to achieve the dynamic power saving.

In the multi-processor system described above, the chipset may also get to know whether any processor requests to use a bus by detecting a control request signal on the bus request pins and turn on or off the corresponding input buffer accordingly, so as to reduce the power consumption thereof.

Figure 4:
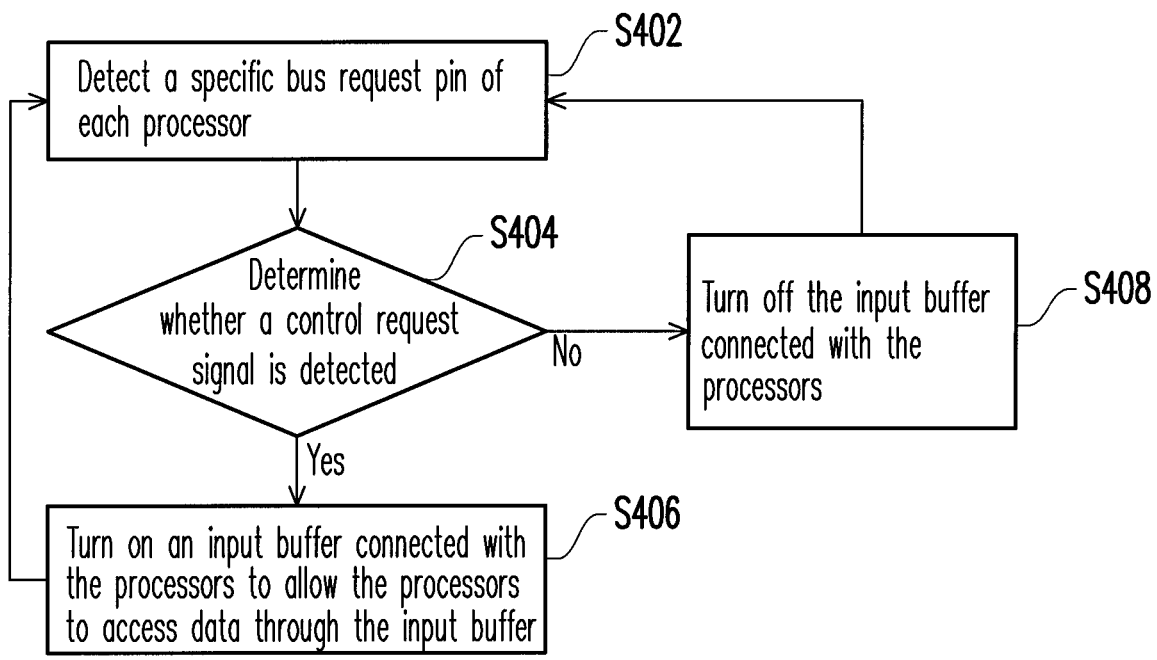
FIG. 4 is a flowchart of a dynamic power saving method of a multi-processor system according to an embodiment of the present invention.

FIG. 4 is a flowchart of a dynamic power saving method of a multi-processor system according to an embodiment of the present invention. Referring to both FIG. 3 and FIG. 4, in the present embodiment, when the processors 302, 304, 306, and 308 of the multi-processor system 300 are in the active status, if none of the processors 302, 304, 306, and 308 requests to use the bus for transmitting data within a certain time period, the input buffer in the chipset 310 connected with the processors is turned off to reduce the power consumed by the input buffer.

When the input buffer in the chipset 310 is the turned-off status, the chipset 310 detects the specific bus request pin BRS# of each processor through the specific bus request line BREQS# (step S402) and determines whether a control request signal is detected (step S404). Before each of the processors issues the control request signal through the specific bus request pin BRS# thereof, the processor first issues a notification signal to other processors through the standard bus request pin BR0# thereof to notify other processors that the current processor has requested to use the bus.

If the chipset 310 detects the control request signal (i.e. a processor requests to use the bus for transmitting data), the chipset 310 turns on the input buffer connected with the processor to allow the processor to access data through the input buffer (step S406). After that, every time when a processor finishes using the bus for transmitting data, if none of the processors 302, 304, 306, and 308 requests to use the input buffer for transmitting data for a certain time period, the input buffer is turned off to reduce the power consumption thereof, and the chipset 310 continues to detect the bus request pins of each processor (step S402).

Contrarily, if the chipset 310 does not detect the control request signal (i.e., no processor requests to use the bus for transmitting data), the chipset 310 maintains the input buffer connected with the processors in the turned-off status (step S408). After that, the chipset 310 continues to detect the specific bus request pin of each processor (step S402).

It should be mentioned that in an embodiment, the chipset may turn on the input buffer after a specific time interval since it detects the control request signal. Accordingly, in order to turn on the input buffer in time for the access operations of the processors, in the present embodiment, the time for the processors to issue the control request signal is brought forward. Namely, a processor issues the control request signal through the specific bus request pin before it issues the control request signal through the standard bus request pins, so that the chipset turns on the input buffer in advance to allow the processor to access data.

As described above, the present invention provides a multi-processor system and a dynamic power saving method thereof, wherein the bus request pins of each processor in the multi-processor system are respectively coupled to a chipset or an additional specific bus request pin is disposed in each processor and coupled to the chipset. Accordingly, when the processors in the multi-processor system are in an active status, if none of the processors requests to use a bus for transmitting data for a certain time period, the chipset temporarily turns off the input buffer, so as to achieve dynamic power saving.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-processor system, comprising:
   a plurality of processors, each of the processors comprising a plurality of standard bus request pins and a specific bus request pin, wherein the standard bus request pins of each of the processors are alternatively connected to the standard bus request pins of other processors respectively; and
   a chipset, coupled to the specific bus request pin of each of the processors, for detecting a control request signal on the specific bus request pins, wherein
   when the chipset detects the control request signal on the specific bus request pins, the chipset turns on an input buffer connected with the processors to allow the processors to access data through the input buffer; and
   when the chipset does not detect the control request signal, the chipset turns off the input buffer.

2. The multi-processor system according to claim 1, wherein the chipset detects the control request signal on the specific bus request pin of each of the processors when the processors are in an active status, so as to turn on or off the input buffer connected with the processors.

3. The multi-processor system according to claim 1, wherein the chipset turns on the input buffer after a specific time interval since the chipset detects the control request signal.

4. The multi-processor system according to claim 1, wherein before each of the processors issues the control request signal through the specific bus request pin, the processor first issues a notification signal to other processors through the standard bus request pins to notify other processors that the current processor already requests to use a bus.

5. The multi-processor system according to claim 1, wherein after the chipset turns on the input buffer connected with the processors, the chipset continues to detect the specific bus request pin of each of the processors.

6. The multi-processor system according to claim 1, wherein after the chipset turns off the input buffer, the chipset continues to detect the specific bus request pin of each of the processors.

7. A dynamic power saving method for a multi-processor system, wherein the multi-processor system comprises a plurality of processors and a chipset, and each of the processors is coupled to the chipset through a specific bus request pin, the dynamic power saving method comprising:
   detecting a control request signal on the specific bus request pins through the chipset;
   turning on an input buffer connected with the processors to allow the processors to access data through the input buffer when the chipset detects the control request signal; and
   turning off the input buffer when the chipset does not detect the control request signal.

8. The dynamic power saving method according to claim 7, wherein the step of turning on the input buffer connected with the processors further comprises:

turning on the input buffer after a specific time interval since the control request signal is detected.

9. The dynamic power saving method according to claim 7, wherein the processors are connected with each other through a plurality of standard bus request pins.

10. The dynamic power saving method according to claim 9, wherein before one of the processors issues the control request signal through the specific bus request pin, the dynamic power saving method further comprises:

issuing a notification signal to other processors through the standard bus request pins to notify other processors that the current processor already requests to use a bus.

11. The dynamic power saving method according to claim 7, wherein after the step of turning on the input buffer connected with the processors, the dynamic power saving method further comprises:

continuing to detect the specific bus request pin of each of the processors.

12. The dynamic power saving method according to claim 7, wherein after the step of turning off the input buffer, the dynamic power saving method further comprises:

continuing to detect the specific bus request pin of each of the processors.

13. A multi-processor system, comprising:

a plurality of processors, each of the processors comprising a plurality of bus request pins, wherein the bus request pins of each of the processors are alternatively connected to the bus request pins of other processors respectively; and a chipset, respectively coupled to the bus request pins of each of the processors, for detecting a control request signal on the bus request pins, wherein when the chipset detects the control request signal on the specific bus request pins, the chipset turns on an input buffer connected with the processors to allow the processors to access data through the input buffer; and when the chipset does not detect the control request signal, the chipset turns off the input buffer.

14. The multi-processor system according to claim 13, wherein the chipset detects the control request signal on the bus request pins when the processors are in an active status, so as to turn on or off the input buffer connected with the processors.

15. The multi-processor system according to claim 13, wherein the chipset turns on the input buffer after a specific time interval since the chipset detects the control request signal.

16. The multi-processor system according to claim 13, wherein the chipset continues to detect the bus request pins of each of the processors after the chipset turns on the input buffer connected with the processors.

17. The multi-processor system according to claim 13, wherein the chipset continues to detect the bus request pins of each of the processors after the chipset turns off the input buffer.

* * * * *